United States Patent
Komori et al.

(10) Patent No.: US 10,238,964 B2
(45) Date of Patent: Mar. 26, 2019

(54) INFORMATION PROCESSING APPARATUS, INFORMATION PROCESSING SYSTEM, AND INFORMATION PROCESSING METHOD

(71) Applicant: SONY CORPORATION, Tokyo (JP)

(72) Inventors: Akihiro Komori, Tokyo (JP); Yusuke Nakagawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 648 days.

(21) Appl. No.: 14/632,108

(22) Filed: Feb. 26, 2015

(65) Prior Publication Data

US 2015/0251089 A1    Sep. 10, 2015

(30) Foreign Application Priority Data

Mar. 7, 2014  (JP) ................. 2014-045056

(51) Int. Cl.
| A63F 13/285 | (2014.01) |
| A63F 13/25  | (2014.01) |
| A63F 13/28  | (2014.01) |

(52) U.S. Cl.
CPC ............ *A63F 13/285* (2014.09); *A63F 13/25* (2014.09); *A63F 13/28* (2014.09)

(58) Field of Classification Search
CPC .. A63F 13/10; A63F 2300/6045; A63F 13/28; A63F 13/285

See application file for complete search history.

(56) References Cited

U.S. PATENT DOCUMENTS

| 8,036,395 B2* | 10/2011 | Nagasaka | G09B 23/06 381/61 |
| 8,754,757 B1* | 6/2014 | Ullrich | G06F 3/016 340/407.1 |
| 9,330,546 B2* | 5/2016 | Ullrich | G06F 3/016 |
| 9,818,271 B2* | 11/2017 | Cruz-Hernandez | G08B 6/00 |
| 9,898,085 B2* | 2/2018 | Saboune | G10L 21/16 |
| 9,905,090 B2* | 2/2018 | Ullrich | G06F 3/016 |
| 2003/0067440 A1* | 4/2003 | Rank | G06F 3/016 345/156 |
| 2006/0017691 A1* | 1/2006 | Cruz-Hernandez | G06F 3/016 345/156 |
| 2006/0107824 A1* | 5/2006 | Bando | G10L 25/00 84/616 |
| 2007/0178952 A1* | 8/2007 | Ehara | A63F 13/00 463/1 |
| 2011/0064235 A1* | 3/2011 | Allston | G10H 1/366 381/63 |
| 2012/0183156 A1* | 7/2012 | Schlessinger | G06F 3/165 381/111 |

(Continued)

FOREIGN PATENT DOCUMENTS

JP    2009-072600 A    4/2009

*Primary Examiner* — Tramar Harper
*Assistant Examiner* — Malina D Blaise
(74) *Attorney, Agent, or Firm* — Chip Law Group

(57) ABSTRACT

There is provided an information processing apparatus including a waveform generation unit configured to generate a waveform according to a relative movement between two objects in a virtual space, and an output control unit configured to control a haptic output and a sound output on the basis of frequency distribution of the waveform generated by the waveform generation unit.

13 Claims, 10 Drawing Sheets

(56) References Cited

U.S. PATENT DOCUMENTS

| | | | |
|---|---|---|---|
| 2014/0292501 A1* | 10/2014 | Lim | G08B 6/00 340/407.2 |
| 2014/0362749 A1* | 12/2014 | Nakamoto | H04L 67/125 370/310 |
| 2014/0368656 A1* | 12/2014 | Hayakawa | G06T 7/13 348/148 |
| 2015/0016681 A1* | 1/2015 | Fukata | G08G 1/165 382/103 |
| 2015/0070146 A1* | 3/2015 | Cruz-Hernandez | G06F 3/016 340/407.1 |
| 2015/0070148 A1* | 3/2015 | Cruz-Hernandez | G08B 6/00 340/407.1 |
| 2015/0253428 A1* | 9/2015 | Holz | G01S 17/42 356/5.01 |
| 2016/0327642 A1* | 11/2016 | Saegusa | G01S 13/583 |

\* cited by examiner

FIG. 4
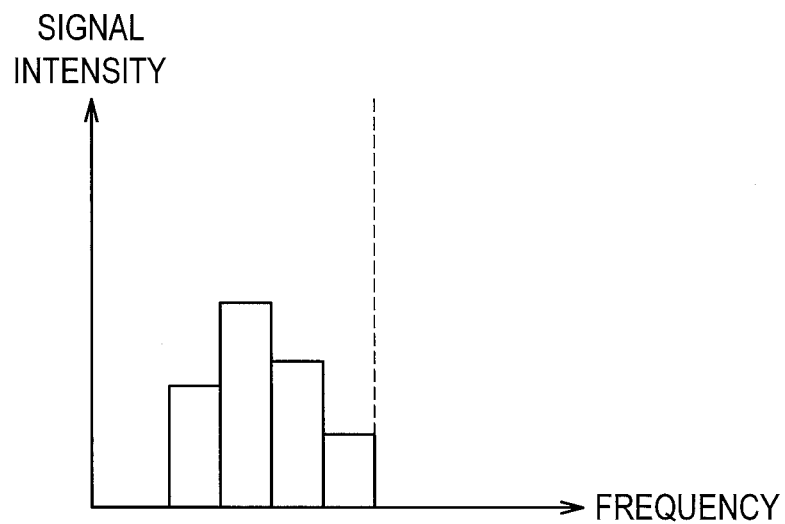
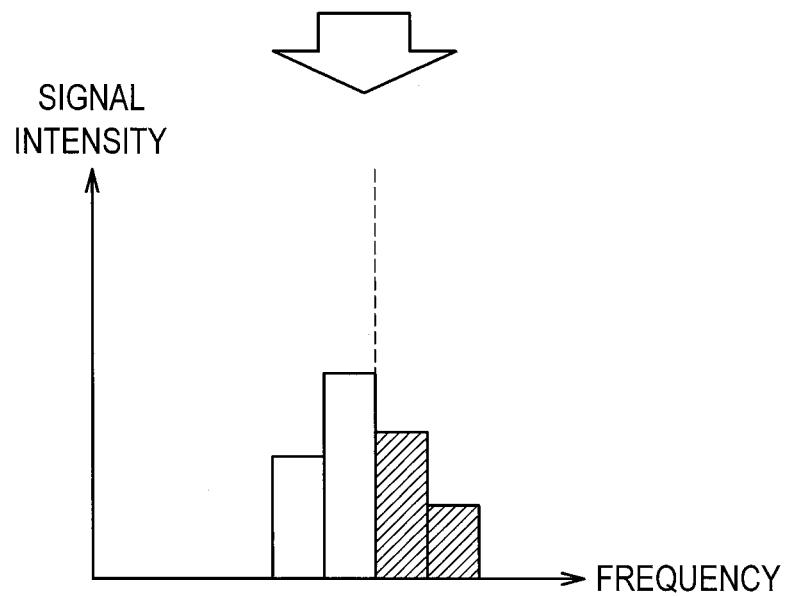

INFORMATION PROCESSING APPARATUS, INFORMATION PROCESSING SYSTEM, AND INFORMATION PROCESSING METHOD

CROSS REFERENCE TO RELATED APPLICATIONS

This application claims the benefit of Japanese Priority Patent Application JP 2014-045056 filed Mar. 7, 2014, the entire contents of which are incorporated herein by reference.

BACKGROUND

The present disclosure relates to an information processing apparatus, an information processing system, an information processing method, and a program.

In order to increase a sense of reality of content such as a movie or a video game, a technique to give users a haptic output such as vibrations according to moving images or sounds has been commonly used in recent years. Accordingly, products related to such a technique have been becoming commercially available.

For example, JP 2009-72600A discloses a technique related to an apparatus that monitors audio signals, video signals, data signals, and the like outputted from software, and when these signals satisfy predetermined conditions, outputs sensory control signals to a vibration sensory actuator, for example.

SUMMARY

However, in general, it becomes difficult for a haptic output actuator to perform an output in response to all input signals when the frequency of an input signal is higher than a range within which an output is possible. Accordingly, some input signals are not outputted due to the frequency, and a user may experience a feeling of strangeness.

Note that it is known that, when frequencies of haptic vibrations become higher, human perception of the vibrations is changed from haptic perception to auditory perception.

Accordingly, an embodiment of the present disclosure provides an information processing apparatus, an information processing system, an information processing method, and a program which can achieve a more realistic sensory output.

According to an embodiment of the present disclosure, there is provided an information processing apparatus including a waveform generation unit configured to generate a waveform according to a relative movement between two objects in a virtual space, and an output control unit configured to control a haptic output and a sound output on the basis of frequency distribution of the waveform generated by the waveform generation unit.

According to another embodiment of the present disclosure, there is provided an information processing system including a waveform generation unit configured to generate a waveform according to a relative movement between two objects in a virtual space, and an output control unit configured to control a haptic output and a sound output on the basis of frequency distribution of the waveform generated by the waveform generation unit.

According to another embodiment of the present disclosure, there is provided an information processing method including generating a waveform according to a relative movement between two objects in a virtual space, and controlling a haptic output and a sound output on the basis of frequency distribution of the generated waveform.

According to another embodiment of the present disclosure, there is provided a program for causing a computer to execute a waveform generation function of generating a waveform according to relative movement between two objects in a virtual space, and an output control function of controlling a haptic output and a sound output on the basis of frequency distribution of the waveform generated by the waveform generation function.

As described above, according to one or more of embodiments of the present disclosure, there are provided an information processing apparatus, an information processing system, an information processing method, and a program which can achieve a more sensory haptic output. Note that the effects described above are not limiting. That is, the technology according to the present disclosure can exhibit any of the effects described in the specification or other effects that are apparent from the descriptions in the specification, along with the above effects or instead of the above effects.

BRIEF DESCRIPTION OF THE DRAWINGS

FIG. 4 shows an example of a change in frequency distribution of a waveform generated in an information processing apparatus according to the embodiment;

DETAILED DESCRIPTION OF THE EMBODIMENT(S)

Figure 1:
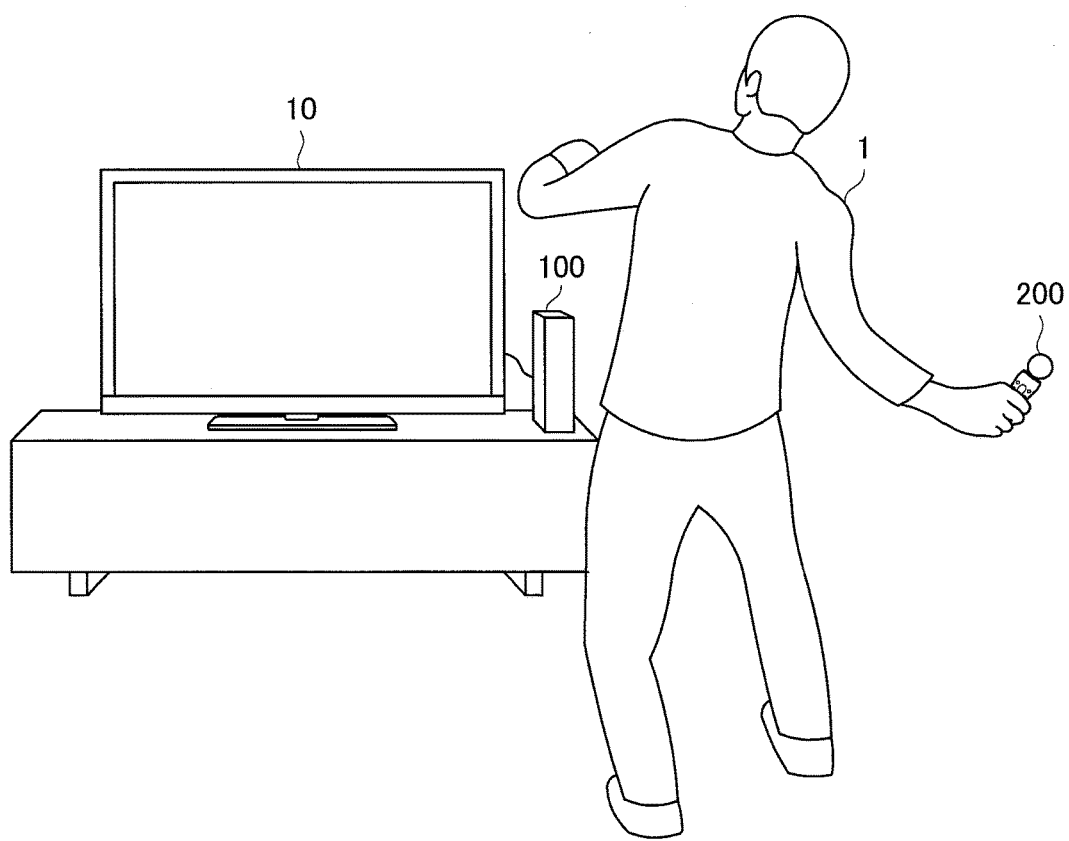
FIG. 1 illustrates an outline of an information processing system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be made in the following order.

1. Outline of information processing system according to embodiment of present disclosure
2. First embodiment of present disclosure (example of output based on frequency distribution of generated waveform)
   2-1. Configuration of information processing system
   2-2. Processing of information processing system
   2-3. Modification example
3. Second embodiment of present disclosure (example of output based on operation pressure)
   3-1. Configuration of information processing system
   3-2. Processing of information processing system
4. Hardware Configuration
5. Conclusion

1. Outline of Information Processing System According to Embodiment of Present Disclosure First, an outline of an information processing system according to an embodiment of the present disclosure will be described with reference to FIG. 1. FIG. 1 illustrates the outline of the information processing system according to an embodiment of the present disclosure.

The information processing system includes an information processing apparatus 100 and a controller 200. The information processing apparatus 100 is a stationary apparatus and has a function of performing processing for a virtual space, a function of performing processing of generating information for a haptic output on the basis of the result of the above processing, and a communication function. The controller 200 is a portable apparatus that can be carried and includes an actuator that performs the haptic output and a communication function. Accordingly, in the information processing system, the information processing apparatus 100 generates information for the haptic output based on the result of processing in the virtual space, the generated information is transmitted to the controller 200, and the controller 200 can perform the haptic output on the basis of the received information.

Further, the controller 200 has a function of detecting a user's operation, and transmits information related to the detected operation to the information processing apparatus 100. Further, the information processing apparatus 100 has a function of detecting the distance from a display screen to the user. Accordingly, in the information processing system, the information processing apparatus 100 can perform processing in the virtual space on the basis of the information related to the user's operation and the distance from the display screen to the user, which are detected by the controller 200.

For example, as shown in FIG. 1, the information processing system can be composed of the information processing apparatus 100 connected to a display apparatus 10 and the controller 200 to be operated by a user 1. The information processing apparatus 100 can provide information related to the result of processing for the virtual space, such as a three-dimensional moving image, to the display apparatus 10, and the display apparatus 10 can display the provided moving image. The information processing apparatus 100 can also generate haptic output signals on the basis of the event and the like that have occurred in the virtual space, and can transmit the generated haptic output signals to the controller 200. The controller 200 can operate a haptic output actuator on the basis of the received haptic output signals.

The controller 200 can also detect an operation by the user 1, such as pressing of a button or displacement of the controller 200, and can transmit information related to the detected operation to the information processing apparatus 100. The information processing apparatus 100 can detect the distance from the display apparatus 10 to the user 1, and can perform processing for the virtual space on the basis of the received information and the detected distance.

It should be noted that, in general, it becomes difficult for the haptic output actuator to perform an output in response to all input signals when the frequency of an input signal is higher than a range within which an output is possible. Accordingly, some input signals are not outputted due to the frequency, and a user may experience a feeling of strangeness. Further, it is known that, when frequencies of vibrations that have been first recognized by haptic perception become higher to be in an audible area, humans recognize the vibrations by auditory perception. For example, first, when a person moves a finger while the finger is in contact with a floor, vibrations are generated and she or he senses the vibrations by haptic perception. Next, when she or he moves the finger faster, frequencies of vibrations become higher. Accordingly, fewer vibrations are sensed by haptic perception, and, vibrations begin to be sensed as sounds instead, by auditory perception. Further, when the pressure of the finger becomes stronger, vibrations recognized by haptic perception are increased, and the volume of sounds recognized by auditory perception is also increased. Accordingly, the information processing system according to an embodiment of the present disclosure performs a haptic output and a sound output according to frequency distribution of input signals.

For example, in a case in which the user 1 operates an object that looks like a hand in a virtual space by using the controller 200 so as to tap a surface of another object that looks like a floor, the information processing apparatus 100 generates a waveform of vibrations on the basis of the tap operation. Next, the information processing apparatus 100 generates output signals on the basis of the frequency distribution of the generated waveform, and transmits each of the generated signals to the controller 200. For example, in a case in which the frequency distribution of the generated waveform includes a frequency in an audible area, the information processing apparatus 100 generates sound output signals in addition to the haptic output signals. Then, having received the haptic output signals and sound output signals, the controller 200 performs the haptic output and sound output on the basis of each of the signals.

In this manner, the information processing system according to an embodiment of the present disclosure generates the waveform according to the movement of the object in the virtual space, and performs the haptic output and sound output on the basis of the frequency distribution of the generated waveform. Accordingly, an output related to frequencies that are not outputted in a case of the haptic output alone becomes possible as a sound output, and the above described phenomenon is reproduced. Thus, it becomes possible for the user to experience a more realistic output. Note that the information processing apparatus 100 and the controller 200 according to first and second embodiments are specified by adding numbers corresponding to the number of embodiments to the end of reference numerals, such as an information processing apparatus 100-1 and an information processing apparatus 100-2, for convenience of the description.

2. First Embodiment of Present Disclosure (Example of Output Based on Frequency Distribution of Generated Waveform)

The outline of the information processing system according to an embodiment of the present disclosure has been described above. Next, an information processing system according to the first embodiment of the present disclosure will be described. In the information processing system according to the present embodiment, the information processing apparatus 100-1 generates a waveform according to a relative movement between two objects in the virtual space, and generates the haptic output signals and sound output signals on the basis of the frequency distribution of the generated waveform. Further, a controller 200-1 performs the haptic output and sound output on the basis of each of the generated signals.

2-1. Configuration of Information Processing System

Figure 2:
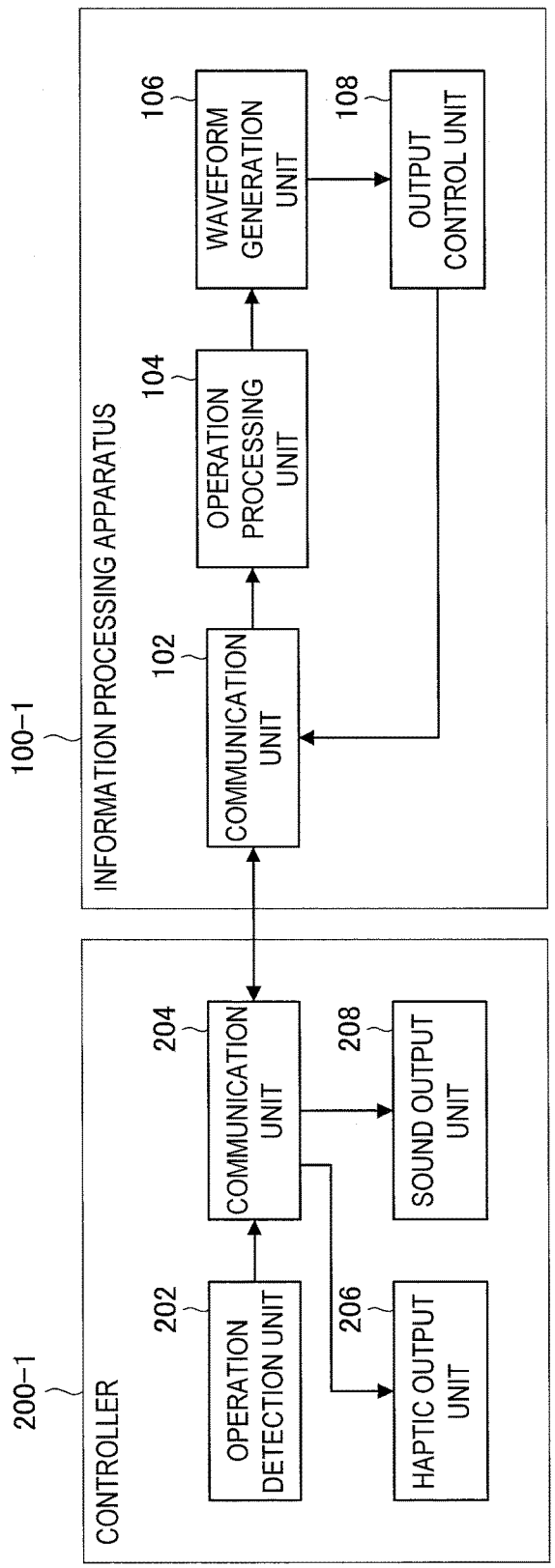
FIG. 2 is a block diagram showing a schematic functional configuration of an information processing system according to a first embodiment of the present disclosure.

First, a configuration of the information processing system according to the first embodiment of the present disclosure will be described with reference to FIG. 2. FIG. 2 is a block diagram showing a schematic functional configuration of the information processing system according to the present embodiment.

The information processing system is composed of the information processing apparatus 100-1 and the controller 200-1 as shown in FIG. 2.

The controller 200-1 includes an operation detection unit 202, a communication unit 204, a haptic output unit 206, and a sound output unit 208.

The operation detection unit 202 detects a user's operation with respect to the controller 200-1. Specifically, the operation detection unit 202 detects an operation related to an operation unit of the controller 200-1 and the state of the controller 200-1, and generates operation information indicating content of the detected operation. For example, the operation detection unit 202 can detect pressing of a button included in the controller 200-1. Further, the operation detection unit 202 includes a sensor such as an acceleration sensor or an angular velocity sensor, and can detect the displacement of the controller 200-1.

The communication unit 204 transmits the operation content detected by the operation detection unit 202 to the information processing apparatus 100-1. Specifically, the communication unit 204 transmits the operation information indicating the detected operation content to the information processing apparatus 100-1 when the operation detection unit 202 detects a user's operation. Further, the communication unit 204 receives the haptic output signals and sound output signals from the information processing apparatus 100-1. For example, the communication unit 204 can communicate with the information processing apparatus 100-1 by radio communication such as Bluetooth (registered trademark) communication, Wi-Fi (registered trademark) communication, or infrared light communication, or wired communication via a wire or the like.

The haptic output unit 206 performs the haptic output on the basis of the haptic output signals. Specifically, when the communication unit 204 receives the haptic output signals from the information processing apparatus 100-1, the haptic output unit 206 generates vibrations that can be sensed by humans by haptic perception on the basis of the received haptic output signals. For example, the haptic output unit 206 can be a vibration actuator such as an eccentric motor or a linear resonant actuator (LRA) and can generate vibrations by operating a built-in motor, coil, or the like on the basis of a waveform related to the received haptic output signals.

The sound output unit 208 performs the sound output on the basis of the sound output signals. Specifically, when the communication unit 204 receives the sound output signals from the information processing apparatus 100-1, the sound output unit 208 performs the sound output on the basis of the received sound output signals. For example, the sound output unit 208 can be a speaker.

As shown in FIG. 2, the information processing apparatus 100-1 includes a communication unit 102, an operation processing unit 104, a waveform generation unit 106, and an output control unit 108.

The communication unit 102 receives the operation information from the controller 200-1. The communication unit 102 also transmits the haptic output signals and sound output signals to the controller 200-1.

Figure 3:
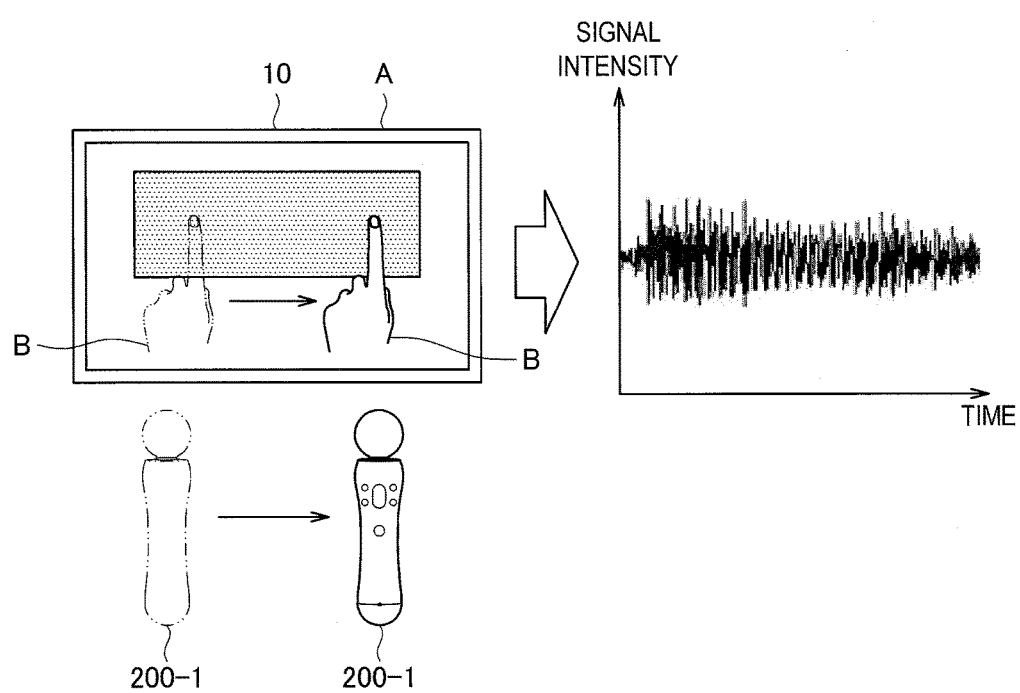
FIG. 3 shows an example of processing of generating a waveform from operation information of an information processing apparatus according to the embodiment.

The operation processing unit 104 performs processing for an object in the virtual space on the basis of the operation information. Specifically, the operation processing unit 104 performs processing of moving the object in the virtual space according to the operation content indicated by the operation information. The moving processing of the object based on the operation information will be described with reference to FIG. 3, for example. FIG. 3 shows an example of processing of generating a waveform from the operation information of the information processing apparatus 100-1 according to the present embodiment.

First, the operation detection unit 202 detects a user's operation with respect to the controller 200-1, and the communication unit 204 transmits the operation information indicating the detected operation content to the information processing apparatus 100-1. For example, as shown in the lower left of FIG. 3, when the user moves the controller 200-1 from the left to the right in the figure, the operation detection unit 202 detects the displacement of the controller 200-1, and the communication unit 204 transmits information related to the displacement to the information processing apparatus 100-1. Note that part of the virtual space including the object related to the user's operation can be displayed by the display apparatus 10, and the user can operate the object while viewing the object and the like displayed by the display apparatus 10.

Next, the operation processing unit 104 moves the object serving as a target of the user's operation in the virtual space on the basis of the operation information received by the communication unit 102. For example, the operation processing unit 104 can calculate information related to the displacement of an object B serving as the target of the user's operation in the virtual space on the basis of information related to the displacement of the controller 200-1. Then, as shown in the upper left of FIG. 3, on the basis of the calculated information related to the displacement, the operation processing unit 104 can move the object B in the virtual space from the left to the right in the figure in a state in which the object B is in contact with an object A. Note that the operation processing unit 104 may set, as a displacement amount of the object, a displacement amount of the same size as a displacement amount of the operation information, or a displacement amount obtained by multiplying the displacement amount of the operation information by a factor.

In this manner, the object in the virtual space is moved by the user's operation. Accordingly, since an output is performed on the basis of the movement of the object related to the user's operation, it becomes possible to increase a sense of reality for the output.

Note that an example in which the object is moved in response to the user's operation has been shown above; however, the object may be moved automatically. For example, in a case in which the user does not perform operations, an application that controls the virtual space including the object can move the object. In this case, by the object being moved automatically, not by the user's operation, so that the information processing system can be applied to an application to which the user's operation is not performed.

Referring to FIG. 2 again, the configuration of the information processing apparatus 100-1 will be described. The waveform generation unit 106 generates a waveform according to a relative movement between two objects in the virtual space. Specifically, in a case in which two objects are moved relatively in a state in which the objects are in contact with each other, the waveform generation unit 106 generates a waveform according to roughness information of a contact face between the objects. For example, the roughness information of the contact face between the objects can be the height of a convex and a concave of one of the objects. More specifically, processing of generating a waveform will be described in detail with reference to FIG. 3.

First, as described above, the operation processing unit 104 moves the object serving as the target of the user's operation in the virtual space. For example, as shown in the upper left of FIG. 3, the object B in the virtual space can be moved from the left to the right in the figure in a state in which the object B is in contact with the object A.

When an object touches another object, or when an object is relatively moved in a state in which the object is in contact with another object, the waveform generation unit 106 acquires the height of a convex and a concave in the contact face between the two objects. For example, the waveform generation unit 106 can acquire the height of a convex and a concave of the object A in the contact face between the object A and the object B shown in FIG. 3. Note that the height of a convex and a concave of the object can be managed as attribution information of the object.

Next, the waveform generation unit 106 generates the waveform according to the acquired height of a convex for every time when a certain period of time elapses. For example, the waveform generation unit 106 can transform the acquired height of a convex into the intensity of a signal to generate the waveforms for every sampling time. For example, the waveform generation unit 106 can transform the height of a convex to the intensity of the signal by using the intensity of a certain signal corresponding to the height of a certain convex.

In this manner, the waveform generation unit 106 generates the waveform according to the roughness information of the contact face between the objects. Accordingly, since output is changed according to the roughness of the surface of the object, the user can recognize the roughness of the surface of the object more realistically.

The generated waveform has frequency distribution according to the speed of the relative movement between the objects. Specifically, the position where the height of a convex and a concave is acquired is changed in a sampling time, so that the speed of the change of the acquisition position of the height of a convex and a concave varies. Accordingly, the generated waveform has different frequencies. For example, a change in the frequency distribution of the waveform according to the speed of the relative movement between the objects will be described in detail with reference to FIG. 4. FIG. 4 shows an example of a change in the frequency distribution of the waveform generated in the information processing apparatus 100-1 according to the present embodiment.

First, when a relative movement occurs between two objects that are in contact with each other, the waveform generation unit 106 generates a waveform on the basis of the height of a convex and a concave of one of the objects. For example, frequencies of the generated waveform can be distributed as shown in the upper part of FIG. 4. Note that the vertical axis of the graph shown in FIG. 4 represents the signal intensity and the horizontal axis thereof represents frequencies.

In the above condition, when only the speed of the relative movement between the objects is increased and the same movement is performed on the objects, the signal intensity of the waveform generated by the waveform generation unit 106 is not changed, but the speed of the change of the acquisition position of the height of a convex and a concave becomes higher per unit time and frequencies of the generated waveform become higher. For example, as shown in a lower part of FIG. 4, compared with the frequency distribution of the upper part having a lower relative speed, the signal intensity is not changed and the frequency distribution can be shifted to be in a higher range.

In this manner, the waveform generation unit generates a waveform having frequency distribution according to the speed of the relative movement between the objects. Accordingly, since an output is changed according to the speed of the movement between the objects, it becomes possible to increase the user's sense of reality with respect to the output.

Here, referring to FIG. 2 again, the configuration of the information processing apparatus 100-1 will be described again. The output control unit 108 controls the haptic output and sound output on the basis of the frequency distribution of the generated waveform. Specifically, the output control unit 108 controls the sound output in a case in which the frequency distribution of the waveform includes a frequency higher than a certain frequency, and controls the haptic output in a case in which the frequency distribution of the waveform includes a frequency lower than the certain frequency. For example, the sound output can be an output of a waveform related to a frequency that is higher than the certain frequency in the waveform, and the haptic output can be an output of a waveform related to a frequency that is lower than the certain frequency in the waveform.

Then, the output control unit 108 generates the haptic output signals and sound output signals which serve as input signals of the above described haptic output and sound output. Specifically, the output control unit 108 filters a certain frequency range of the generated waveform to generate each of the haptic output signals and sound output signals. For example, when a low pass filter (LPF) is used on the generated waveform, it is possible to generate the haptic output signals in which frequencies are attenuated in a frequency range higher than a broken line in the vertical direction shown in the lower part of FIG. 4, for example. Further, when a high pass filter (HPF) is used on the generated waveform, it is possible to generate sound output signals in which frequencies are attenuated in a frequency range lower than a broken line in the vertical direction shown in the lower part of FIG. 4, for example. Note that the certain frequency can be a frequency near the lower limit of the audible area (hereinafter also referred to as audible frequency).

In this manner, the output control unit 108 controls the sound output in a case in which the frequency distribution of the waveform includes a frequency higher than the audible frequency, and controls the haptic output in a case in which the frequency distribution of the waveform includes a frequency lower than the audible frequency. Accordingly, since the sound output and haptic output are controlled on the basis of the audible frequency, it becomes possible to achieve a realistic output. Further, the output control unit 108 performs control in a manner that the sound output is an output of a waveform related to a frequency that is higher than the certain frequency and the haptic output is an output of a waveform related to a frequency that is lower than the certain frequency. Accordingly, since the waveform related to a frequency that is suitable for either the sound output or the haptic output is outputted by the corresponding output, it becomes possible to perform an output that fits in with the reality.

Further, the output control unit 108 sets, as the input signals of the haptic output and sound output, the waveform generated by the waveform generation unit 106. Accordingly, since an output corresponding to the movement of an object is performed, it becomes possible to give the user the sense of reality for the output. Furthermore, the output control unit 108 sets, as the input signals of the haptic output, the waveform from which frequencies higher than the certain frequency are filtered from the frequency distribution of the generated waveform. The output control unit also sets, as the input signals of the sound output, the waveform from which frequencies lower than the certain frequency are filtered from the frequency distribution of the waveform. Accordingly, since high frequencies that are unlikely to be outputted by the haptic output actuator are attenuated, or frequencies that are lower than the audible frequency are attenuated, it becomes possible to prevent the entrance of noise and the like into the output.

Not that an example of using two kinds of filters of the LPF and the HPF has been described above; however, in addition to the two kinds of filters, a band pass filter (BPF) may be used, which filters frequencies in a certain frequency range, and the output control unit 108 may set, as input signals of another haptic output actuator, a waveform subjected to filtering processing by the BPF. For example, the frequency range filtered by the BPF may be a frequency range between the frequency range filtered by the LPF and the frequency range filtered by the HPF, which is a frequency range lower than the certain frequency, i.e., the audible frequency. Further, the output control unit 108 may set, as the input signals of the other haptic output actuator, a waveform obtained by using the BPF on the generated waveform. For example, the other haptic output actuator corresponding to the BPF may be an eccentric motor, and the other haptic output actuator that sets, as the input signals, a waveform obtained by using the BPF may be an LRA. In this case, since the filters and haptic output actuators that are suitable for the frequency distribution of the waveform serving as input signals are used, it becomes possible to increase the sense of reality or haptic vibrations.

2-2. Processing of Information Processing System

Figure 5:
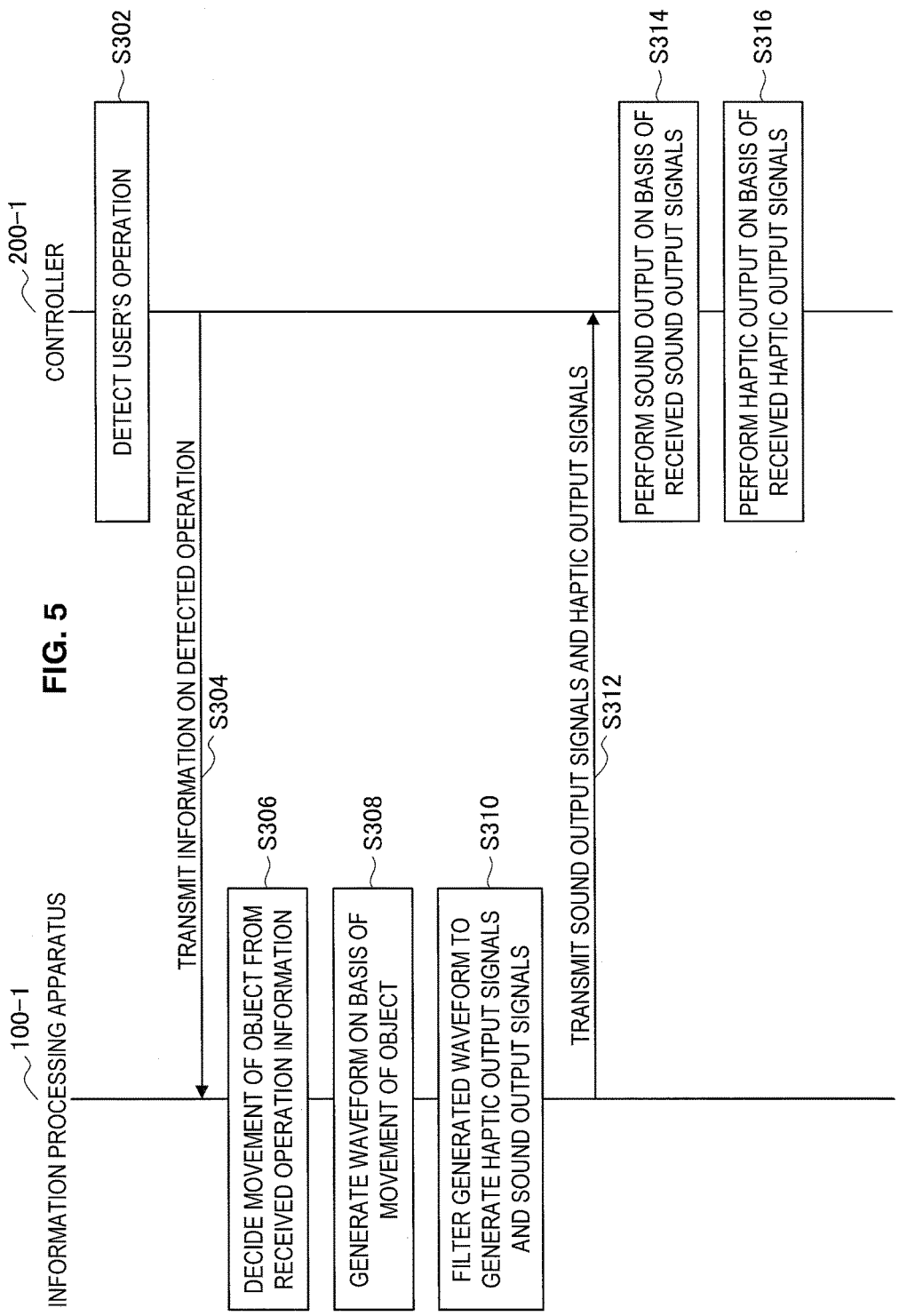
FIG. 5 is a sequence diagram conceptually showing processing of an information processing system according to the embodiment.

Next, processing of the information processing system in the present embodiment will be described with reference to FIG. 5. FIG. 5 is a sequence diagram conceptually showing the processing of the information processing system according to the present embodiment.

First, the controller 200-1 detects a user's operation (step S302). Specifically, the operation detection unit 202 detects the user's operation with respect to the controller 200-1, and generates the operation information indicating the detected operation content.

Next, the controller 200-1 transmits information on the detected operation to the information processing apparatus 100-1 (step S304). Specifically, the communication unit 204 transmits the operation information, generated by the operation detection unit 202, to the information processing apparatus 100-1.

Then, the information processing apparatus 100-1 decides the movement of an object from the received operation information (step S306). Specifically, the operation processing unit 104 performs moving processing of the object in the virtual space on the basis of the operation information received by the communication unit 102.

Next, the information processing apparatus 100-1 generates a waveform on the basis of the movement of the object (step S308). Specifically, when one of the objects is moved relatively by the operation processing unit 104 in a state in which the two objects are in contact with each other in the virtual space, the waveform generation unit 106 generates the waveform on the basis of the change of the acquisition position of the height of a convex and a concave in the contact face between the two objects.

Next, the information processing apparatus 100-1 filters the generated waveform to generate the haptic output signals and sound output signals (step S310). Specifically, the output control unit 108 generates the haptic output signals by using the LPF on the waveform generated by the waveform generation unit 106, and generates the sound output signals by using the HPF on the generated waveform.

Next, the information processing apparatus 100-1 transmits the sound output signals and haptic output signals to the controller 200-1 (step S312). Specifically, the communication unit 102 transmits the generated sound output signals and haptic output signals to the controller 200-1.

Then, the controller 200-1 performs the sound output on the basis of the received sound output signals (step S314). Specifically, the sound output unit 208 performs the sound output on the basis of the sound output signals received by the communication unit 204.

Next, the controller 200-1 performs the haptic output on the basis of the received haptic output signals (step S316). Specifically, the haptic output unit 206 performs the haptic output on the basis of the haptic output signals received by the communication unit 204.

In this manner, according to the first embodiment of the present disclosure, the information processing system generates the waveform according to the relative movement between the objects in the virtual space, and performs the haptic output and sound output on the basis of the haptic output signals and sound output signals generated on the basis of the frequency distribution of the generated waveform. Accordingly, since the waveform related to frequencies that are not outputted by the haptic output actuator is outputted as sounds, it becomes possible to relieve the user's feeling of strangeness with respect to the output.

2-3. Modification Example

The first embodiment of the present disclosure has been described above. Note that the present embodiment is not limited to the above example. A modification example of the present embodiment will be described below.

As a modification example of the present embodiment, the filtering intensity of filtering performed by the output control unit 108 may be changed according to the speed of the relative movement between the objects. Specifically, the operation processing unit 104 calculates the speed of the relative movement between the objects for every certain period of time, and the output control unit 108 changes the filtering intensity of the LPF and the HPF according to the calculated speed of the objects. For example, the output control unit 108 can normalize the calculated speed of the objects by performing division by a certain reference speed or the like, and give the normalized value to the LPF and the HPF. As the given value is larger, that is, as the speed of the objects is higher, the LPF can make the filtering intensity higher and attenuate frequencies higher than the certain frequency more. As the given value is larger, the HPF can make the filtering intensity lower and reduce attenuating rate of frequencies lower than the certain frequency.

In this manner, according to the modification example of the present embodiment, the filtering intensity of filtering performed by the output control unit 108 is changed according to the speed of the relative movement between the objects. Accordingly, since an output that fits the height of the frequency distribution of the generated waveform is emphasized, it becomes possible to promote the user to notice the change in frequencies and to increase the sense of reality for an output corresponding to a user's operation.

3. Second Embodiment of Present Disclosure (Example of Output Based on Operation Pressure)

Next, an information processing system according to the second embodiment of the present disclosure will be described. In the information processing system according to the present embodiment, a controller 200-2 detects an operation pressure, and the information processing apparatus 100-2 changes the signal intensity of the generated waveform according to the detected operation pressure.

3-1. Configuration of Information Processing System

Figure 6:
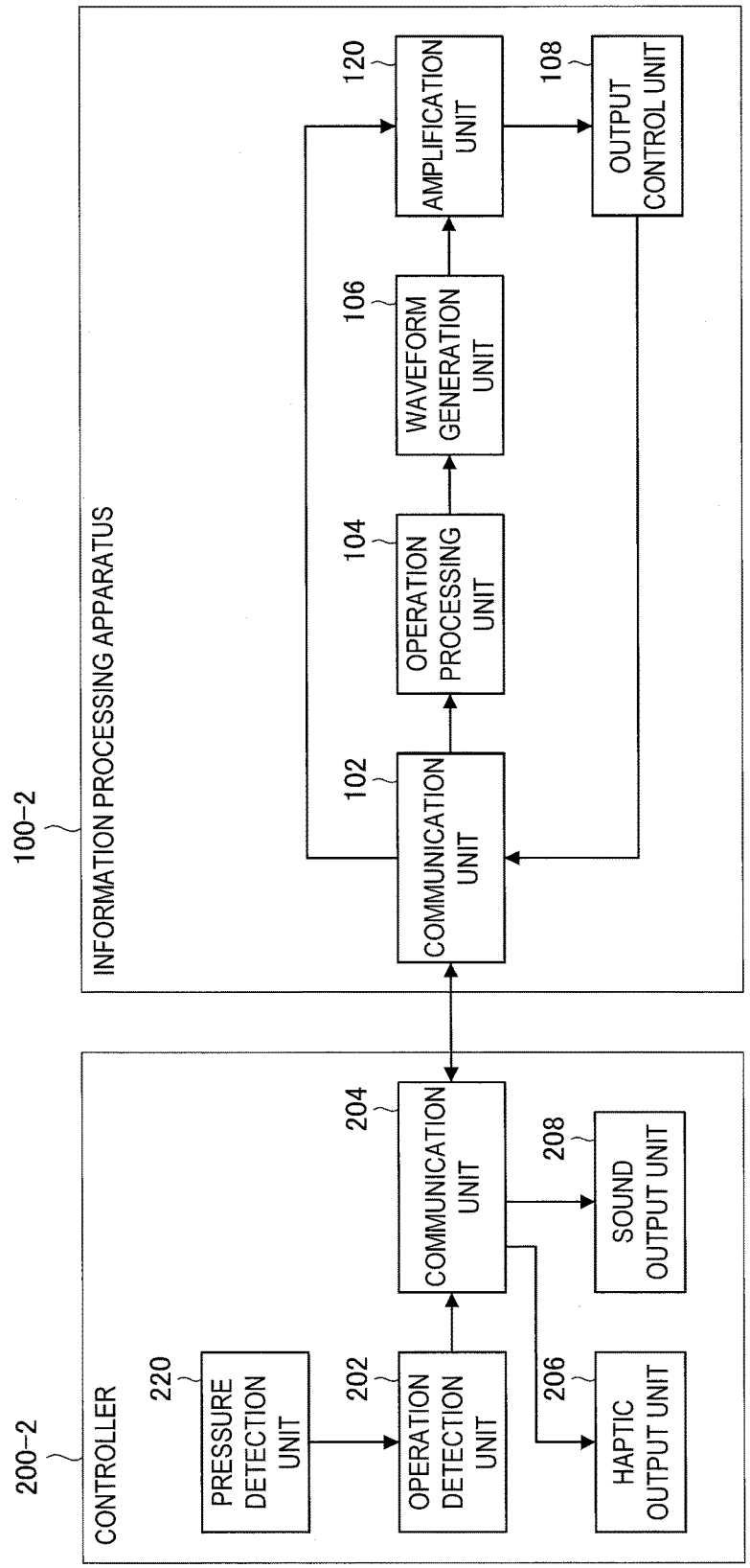
FIG. 6 is a block diagram showing a schematic functional configuration of an information processing system according to a second embodiment of the present disclosure.

First, a configuration of the information processing system according to the second embodiment of the present disclosure will be described with reference to FIG. 6. FIG. 6 is a block diagram showing a schematic functional configuration of the information processing system according to the present embodiment.

As shown in FIG. 6, the controller 200-2 includes, in addition to the operation detection unit 202, the communication unit 204, the haptic output unit 206, and the sound output unit 208, a pressure detection unit 220.

The pressure detection unit 220 detects the pressure related to a user's operation with respect to the controller 200-2. For example, the pressure detection unit 220 can detect a pressing force related to the operation on an operation unit (not shown), such as a touch panel, with a finger of the user or the like, the operation unit also being included in the controller 200-2. For example, the pressure detection unit 220 can be a pressure-sensitive sensor that detects the pressure from a change in an electrostatic capacitance or the like.

The operation detection unit 202 detects the position of the user's operation with respect to the controller 200-2. Specifically, the operation detection unit 202 detects the position of the user's operation with respect to the above described operation unit, and generates the operation information indicating the detected operation position and pressure information indicating the pressure detected by the pressure detection unit 220, the pressure corresponding to the operation position.

As shown in FIG. 6, further, the information processing apparatus 100-2 includes, in addition to the communication unit 102, the operation processing unit 104, the waveform generation unit 106, and the output control unit 108, an amplification unit 120.

Figure 7:
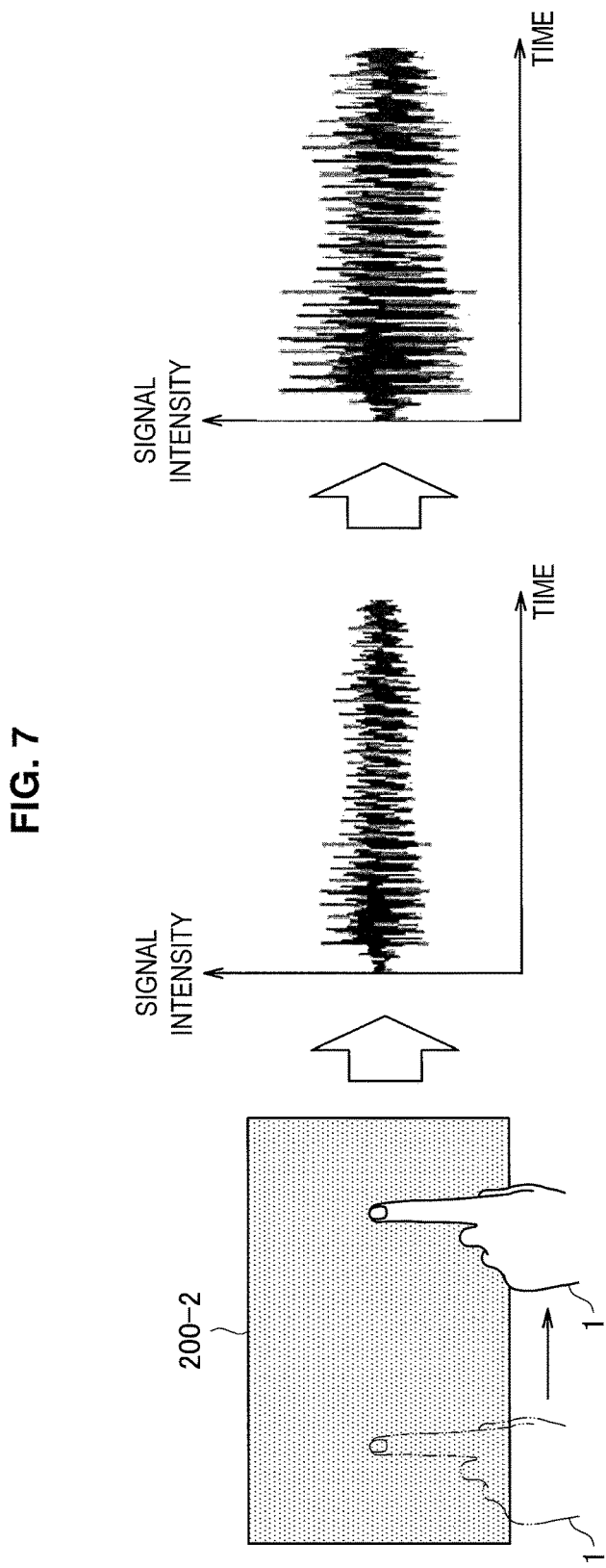
FIG. 7 shows an example of adjusting processing of signal intensity related to a waveform generated from operation information of an information processing apparatus according to the embodiment.

The amplification unit 120 decides the signal intensity of the waveform generated by the waveform generation unit 106 on the basis of the pressure information received by the communication unit 102. Specifically, when the waveform generation unit 106 generates the waveform, the amplification unit 120 adjusts the signal intensity of the generated waveform according to the strength of the pressure indicated by the pressure information. For example, processing of the amplification unit 120 will be described in detail with reference to FIG. 7. FIG. 7 shows an example of adjusting processing of the signal intensity related to the waveform generated from the operation information of the information processing apparatus 100-2 according to the present embodiment.

First, the operation detection unit 202 detects the position of the user's operation with respect to the controller 200-2, and the pressure detection unit 220 detects the pressure at the position. For example, as shown in the left of FIG. 7, when the user 1 touches the operation unit such as a touch panel of the controller 200-2 with her/his finger, the operation detection unit 202 detects the position of the finger of the user 1 on the touch panel, and the pressure detection unit 220 detects the pressure at the position of the finger. Further, when the user 1 moves the finger from the left to the right in the figure in the horizontal direction, for example, in a state in which the finger is in contact with the touch panel, the operation detection unit 202 detects the displacement of the position of the finger, and the pressure detection unit 220 detects the pressure in each position of the finger. Then, the operation information indicating the detected position of the finger and pressure information indicating the pressure at the position are transmitted to the information processing apparatus 100-2 by the communication unit 204.

Next, the operation processing unit 104 associates the operation position indicated by the operation information received by the communication unit 102 with the position in the virtual space, moves the position of an object on the basis of the displacement of the operation position, and changes the shape of the object in a contact part according to the strength of the pressure indicated by the pressure information received by the communication unit 102.

Next, the waveform generation unit 106 generates the waveform according to the relative movement between the objects. This processing is substantially the same as the processing in the first embodiment, and therefore a detailed description thereof is omitted here.

When the operation processing unit 104 makes the two objects be in contact with each other or moves an object relatively in a state in which the object is in contact with the other object, the amplification unit 120 acquires the pressure information in a contact face between the two objects. For example, the operation information received by the communication unit 102 can be stored in a storage unit also included in the information processing apparatus 100-2, and the amplification unit 120 can acquire, from the storage unit, the pressure information at the operation potion indicated by the operation information corresponding to the contact face between the objects.

Next, when the waveform generation unit 106 generates a waveform, the amplification unit 120 changes the signal intensity of the generated waveform according to the strength of the pressure indicated by the acquired pressure information. For example, when the waveform shown in the middle of FIG. 7 is generated by the waveform generation unit 106, the amplification unit 120 increases the signal intensity as shown in the right of FIG. 7 according to the strength of the pressure indicated by the acquired pressure information. For example, as the pressure indicated by the acquired pressure information is stronger, the amplification unit 120 can increase the signal intensity of the waveform.

In this manner, the amplification unit 120 decides the signal intensity of the waveform generated by the waveform generation unit 106 according to the user's operation pressure, that is, the pressure on the contact face between the objects. Accordingly, since the output is changed according to the detected pressure, it becomes possible to make the user to sense a more realistic feedback with respect to the user's operation.

Figure 8:
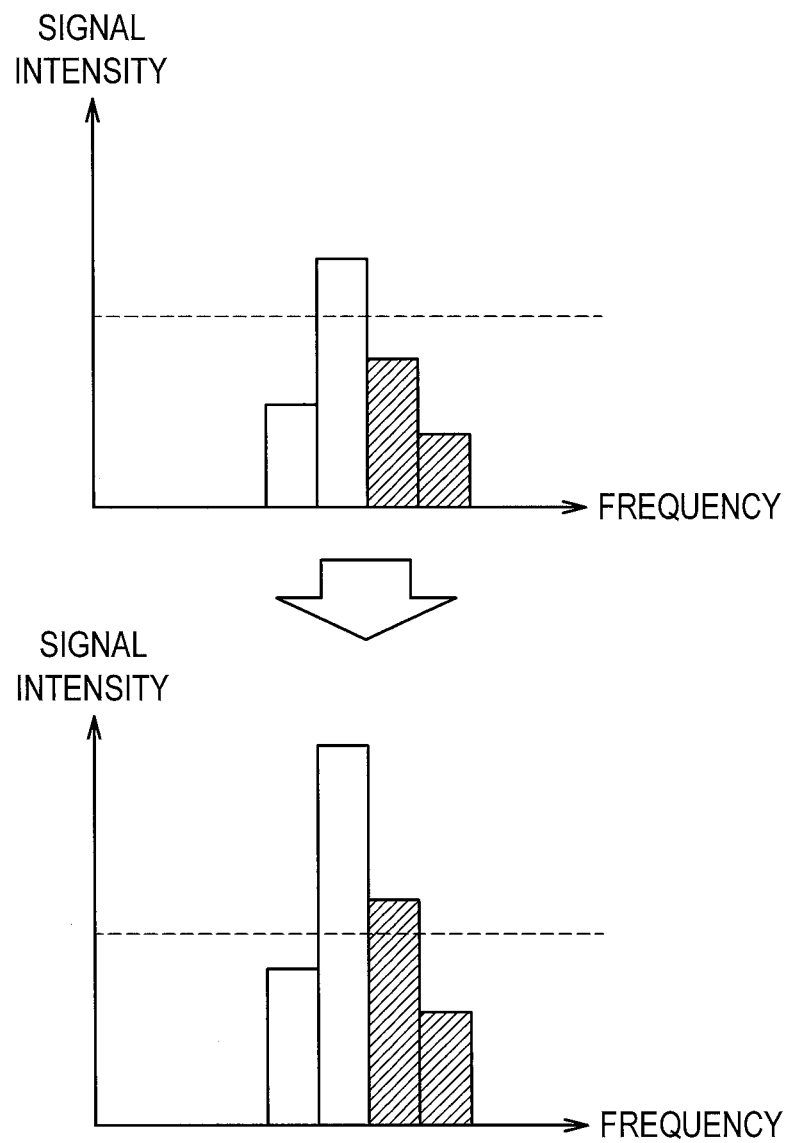
FIG. 8 shows another example of a change in frequency distribution of a waveform generated in an information processing apparatus according to the embodiment.

Here, referring to FIG. 6 again, the configuration of the information processing apparatus 100-2 will be described again. In a case in which the signal intensity of frequencies included in the frequency distribution of the waveform is higher than a certain threshold, the output control unit 108 causes an output. Specifically, in a case in which the signal intensity of the waveform obtained by using the LPF or the HPF is higher than the certain threshold, the output control unit 108 sets the obtained waveform as output signals. For example, control processing of output signals by using the signal intensity will be described in detail with reference to FIG. 8. FIG. 8 shows another example of a change in the frequency distribution of the waveform generated in the information processing apparatus 100-2 according to the present embodiment.

First, when the two objects are made in contact with each other and relatively moved, the waveform generation unit 106 generates a waveform on the basis of the height of a convex and a concave of an object. For example, frequencies of the generated waveform can be distributed as shown in an upper part of FIG. 8.

Next, the output control unit 108 filters the generated waveform by using the LPF or the HPF. For example, the frequency distribution of the waveform obtained by using the LPF can be the distribution of frequencies represented as white bars in the upper part of FIG. 8, and the frequency distribution of the waveform obtained by using the HPF can be the distribution of frequencies represented as hatched bars in the upper part of FIG. 8.

Next, the output control unit 108 sets, as output signals, a waveform in which the signal intensity of the waveform obtained by filtering is higher than the certain threshold. For example, as shown in the upper part of FIG. 8, since the waveform obtained by using the LPF includes frequencies having signal intensity higher than the certain threshold, such as the broken line in the upper part of FIG. 8, the output control unit 108 can set the obtained waveform as the haptic output signals. In contrast, since the waveform obtained by using the HPF includes frequencies having signal intensity lower than the broken line in the upper part of FIG. 8, the output control unit 108 does not set the obtained waveform as sound output signals.

In contrast, when only the user's operation pressure is increased and the same movement between the objects is performed at the same speed, the waveform generated by the waveform generation unit 106 does not have different frequency distribution, but the signal intensity is increased in the entire frequencies that are distributed. For example, as shown in a lower part of FIG. 8, compared with the frequency distribution of the upper part in which the pressure is relatively low, the height of frequencies is not changed and the signal intensity can be increased.

Then, since the signal intensity of frequencies of the waveform obtained by using the HPF shown in the lower part of FIG. 8 is higher than the broken line shown in the lower part of FIG. 8, the output control unit 108 can set the obtained waveform as sound output signals.

In this manner, in a case in which the signal intensity of frequencies included in the frequency distribution of the generated waveform is higher than the certain threshold, the output control unit 108 causes an output. Accordingly, since the presence and absence of an output is emphasized, it becomes possible to promote the user to notice a change in the signal intensity and to further increase the sense of reality of the output corresponding to the user's operation.

3-2. Processing of Information Processing System

Figure 9:
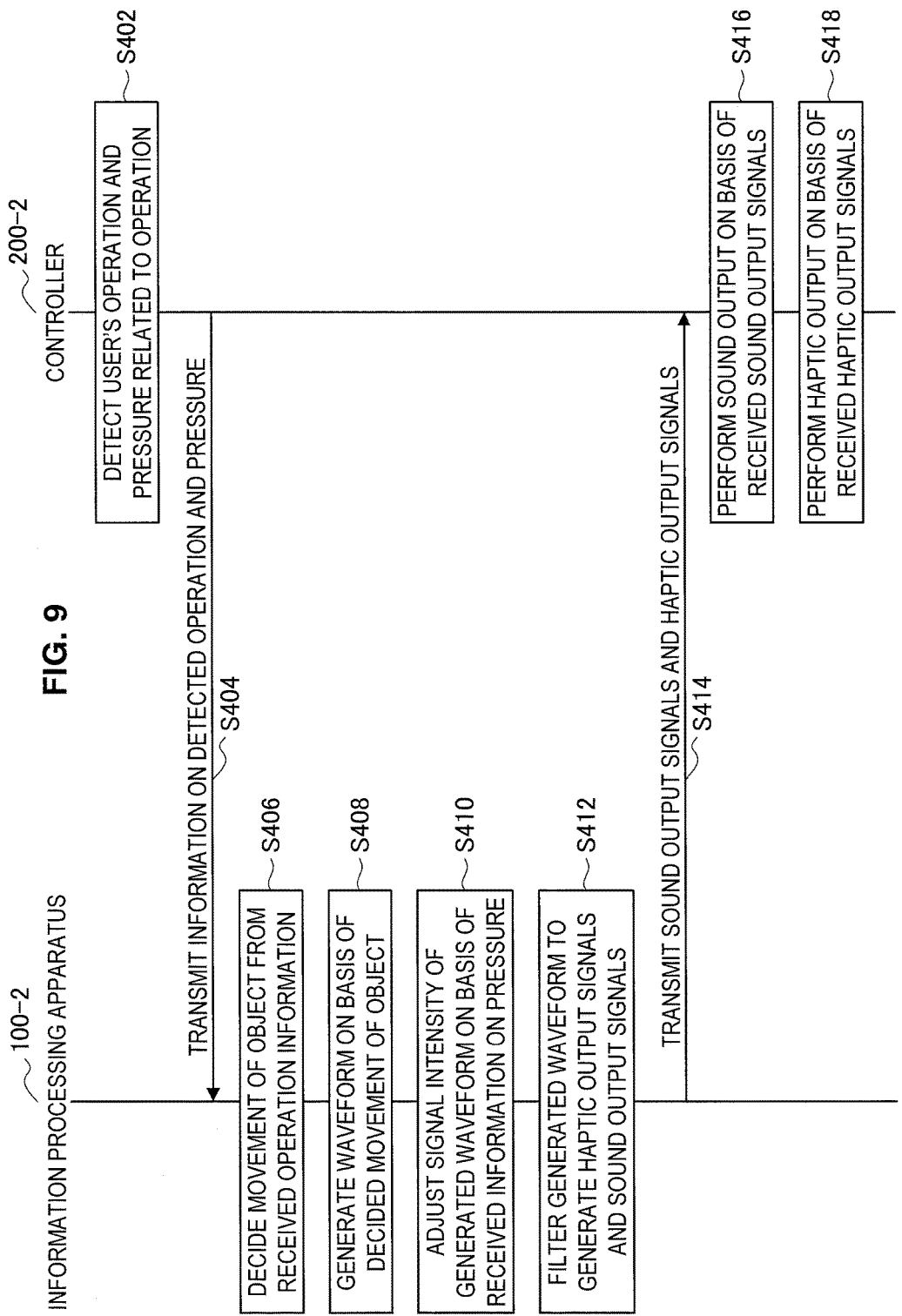
FIG. 9 is a sequence diagram conceptually showing processing of an information processing system according to the embodiment.

Next, processing of the information processing system in the present embodiment will be described with reference to FIG. 9. FIG. 9 is a sequence diagram conceptually showing the processing of the information processing system according to the present embodiment. Note that a detailed description of processing that is substantially the same as that of the information processing system in the first embodiment will be omitted.

First, the controller 200-2 detects a user's operation and the pressure related to the operation (step S402). Specifically, the pressure detection unit 220 detects the pressure related to the user's operation, and the operation detection unit 202 detects the position of the user's operation.

Next, the controller 200-2 transmits information on the detected operation and pressure to the information processing apparatus 100-2 (step S404). Specifically, the operation detection unit 202 generates operation information indicating the detected operation position and the pressure detected by the pressure detection unit 220, and the communication unit 204 transmits the generated operation information to the information processing apparatus 100-2.

Next, the information processing apparatus 100-2 decides the movement of an object from the received operation information (step S406). Specifically, the operation processing unit 104 moves the position of the object on the basis of the operation information received by the communication unit 102, and changes the shape of the object in a contact part according to the pressure indicated by the operation information.

Next, the information processing apparatus 100-2 generates a waveform on the basis of the decided movement of the object (step S408). Specifically, the information processing apparatus 100-2 performs substantially the same processing as in the step S308 in the first embodiment.

Next, the information processing apparatus 100-2 adjusts the signal intensity of the generated waveform on the basis of the received information on the pressure (step S410). Specifically, when the waveform generation unit 106 generates the waveform, the amplification unit 120 changes the signal intensity of the generated waveform according to the strength of the pressure indicated by the received operation information.

Next, the information processing apparatus 100-2 filters the generated waveform to generate the haptic output signals and sound output signals (step S412). Specifically, in a case in which the waveform obtained by filtering the waveform in which the signal intensity is adjusted includes a frequency that is higher than the certain threshold, the output control unit 108 sets the waveform as output signals.

Next, the information processing apparatus 100-2 transmits the sound output signals and haptic output signals to the controller 200-2 (step S414). Specifically, the information processing apparatus 100-2 performs substantially the same processing as in the step S312 in the first embodiment.

Then, the controller 200-2 performs the sound output on the basis of the received sound output signals (step S416), and performs the haptic output on the basis of the received haptic output signals (step S418).

In this manner, according to the second embodiment of the present disclosure, the information processing system detects the pressure related to the user's operation and changes the signal intensity of the generated waveform according to the detected pressure. Accordingly, since the output is changed according to the detected pressure, it becomes possible to make the user sense a more realistic feedback with respect to the user's operation.

4. Hardware Configuration

Embodiments of the present disclosure have been described above. The processing of the information processing apparatus 100 described above is implemented by cooperation between software and hardware of the information processing apparatus 100 described below.

Figure 10:
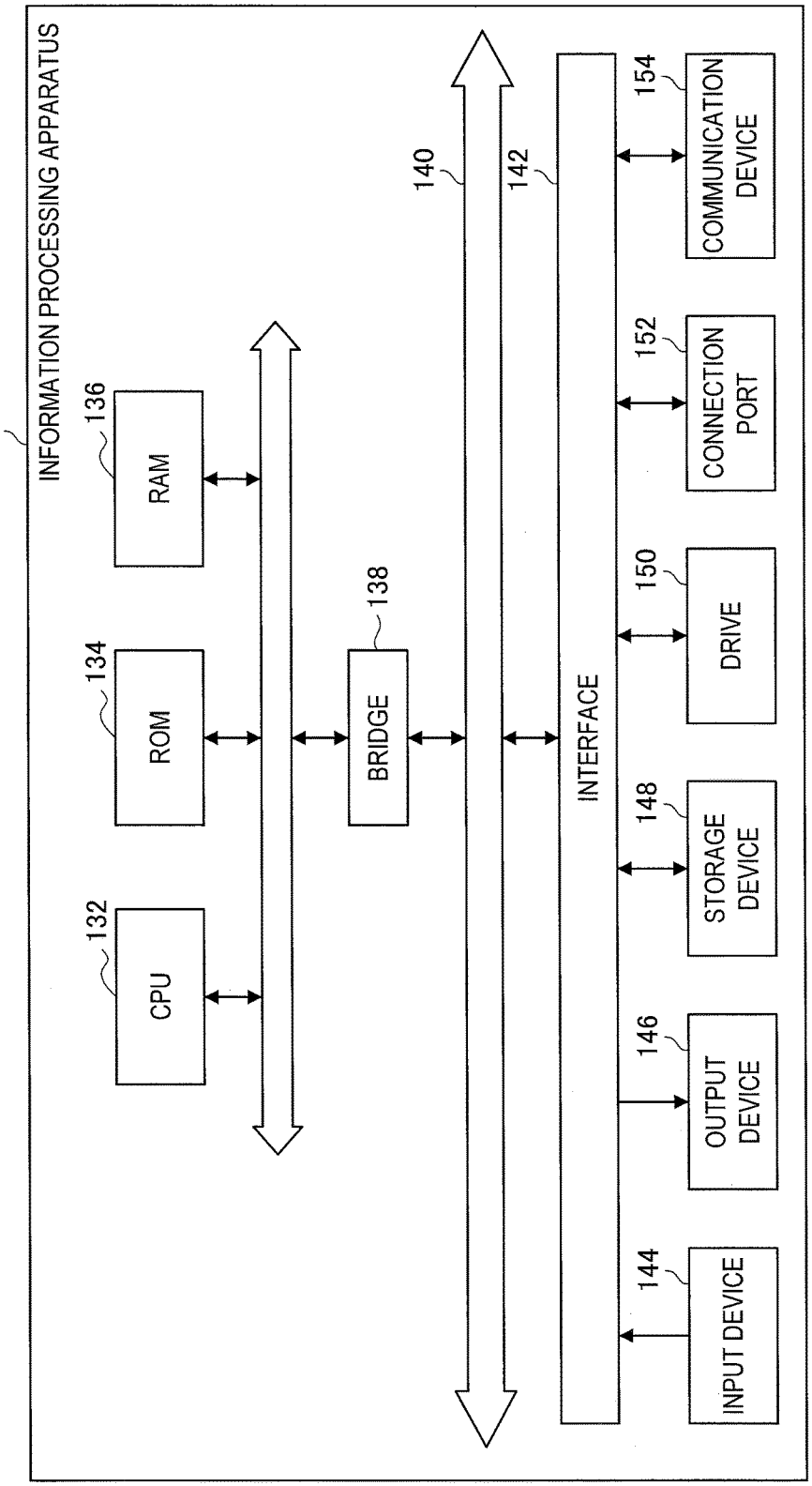
FIG. 10 is an explanatory diagram showing a hardware configuration of an information processing apparatus according to an embodiment of the present disclosure.

FIG. 10 is an explanatory diagram showing a hardware configuration of the information processing apparatus 100 according to an embodiment of the present disclosure. As illustrated in FIG. 10, the information processing apparatus 100 includes a central processing unit (CPU) 132, read only memory (ROM) 134, random access memory (RAM) 136, a bridge 138, a bus 140, an interface 142, an input device 144, an output device 146, a storage device 148, a drive 150, a connection port 152, and a communication device 154.

The CPU 132 functions as an arithmetic processing device and a control device and cooperates with various programs to thereby realize the operations of the operation processing unit 104, the waveform generation unit 106, the output control unit 108, and the amplification unit 120 in the information processing apparatus 100. The CPU 132 may be a microprocessor. The ROM 134 stores programs, operation parameters, or the like to be used by the CPU 132. The RAM 136 temporarily stores programs for use in the execution of the CPU 132, parameters which change as appropriate in the execution, and the like. By the ROM 134 and the RAM 136, a part of the storage unit in the information processing apparatus 100 is realized. The CPU 132, the ROM 134, and the RAM 136 are connected to each other through an internal bus constituted by a CPU bus and the like.

The input device 144 is constituted by, for example, an input unit which allows the user to input information, such as a mouse, a keyboard, a touch panel, a button, a microphone, a switch, and a lever, an input control circuit which generates an input signal based on an input by the user, and then outputs the signal to the CPU 132, and the like. The user of the information processing apparatus 100 can operate the input device 144 to input various data to the information processing apparatus 100 or instruct the information processing apparatus 100 to perform a processing operation.

The output device 146 performs an output operation to a device, such as a liquid crystal display (LCD), an organic light emitting diode (OLED), and a lamp. Furthermore, the output device 146 may include a loudspeaker and a headphone for outputting sounds.

The storage device 148 is a device for data storage. The storage device 148 may include a storage medium, a recording device for recording data in the storage medium, a reading device for reading the data from the storage medium, and a deleting device for deleting data recorded in the storage medium. The storage device 148 stores a program executed by the CPU 132 and various types of data.

The drive 150 is a reader-writer for a storage medium and is built in or externally attached to the information processing apparatus 100. The drive 150 reads out information recorded on a removable storage medium that is attached thereto, such as a magnetic disk, an optical disk, a magneto-optical disk, or a semiconductor memory, and then outputs the information to the RAM 134. The drive 150 is also able to write information to a removable storage medium.

The connection port 152 is a bus for connection with an information processing apparatus or peripheral devices provided outside the information processing apparatus 100. The connection port 152 may be universal serial bus (USB).

The communication device 154 is, as an example of the communication unit 102 of the information processing apparatus 100, a communication interface constituted by a communication device for connection with a network. The communication device 154 may be an infrared communication compatible device, a wireless local area network (LAN) compatible communication device, a long-term evolution (LTE) compatible communication device, or a wired communication device that performs communication through wire.

5. Conclusion

As described above, according to the first embodiment of the present disclosure, since the waveform related to frequencies that are not outputted by the haptic output actuator is outputted as sounds, it becomes possible to relieve the user's feeling of strangeness with respect to the output. According to the second embodiment of the present disclosure, since the output is changed according to the detected pressure, it becomes possible to make the user sense a more realistic feedback with respect to the user's operation.

Hereinabove, although the preferred embodiments of the present disclosure have been described in detail with reference to the accompanying drawings, the technical scope of the present disclosure is not limited thereto. It should be understood by those skilled in the art that various modifications, combinations, sub-combinations and alterations may occur depending on design requirements and other factors insofar as they are within the scope of the appended claims or the equivalents thereof.

For example, the above embodiments have shown the examples in which the height of a convex and a concave of the object is transformed into the signal intensity and the change of the acquisition position of the height of a convex and a concave is represented as the waveform; however, the present technology is not limited to the above examples. For example, the waveform generation unit 106 may generate the waveform on the basis of the waveform of certain frequency distribution. Specifically, when the relative movement occurs in a state in which the objects are in contact with each other, the waveform generation unit 106 acquires the waveform of the certain frequency distribution stored in the storage unit, and varies frequencies in the acquired waveform according to the speed of the relative movement between the objects. For example, when the speed of the relative movement between the objects is increased, the frequencies of the waveform are changed in a manner that the frequency distribution of the acquired waveform is shifted to be in a higher region. In this case, since the processing of generating the waveform is simplified, it becomes possible to reduce the processing load and to increase the processing speed. Note that the waveform of the certain frequency distribution may differ according to the material of the object or the like.

Further, the controller 200 may further include a sound output control unit, and the sound output control unit may cause the sound output unit 208 to perform the sound output according to the start of the operation of the haptic output actuator. Specifically, when the communication unit 204 receives the sound output signals, the sound output control unit holds the sound output signals temporarily, and after a certain period of time elapses, the sound output control unit provides the sound output signals to the sound output. Note that the certain period of time can be stored in the storage unit that is also included in the controller 200. In this case, by the sound output being performed according to a delay of the operation of the haptic output actuator, it becomes possible to prevent the user from experiencing the feeling of strangeness.

It should be noted that in the present disclosure, the operations described in the sequence diagram may be performed not only in time series in the described order but in parallel or individually. Further, it should be understood that the operations performed in time series may be performed in a different order from the described order.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1) An information processing apparatus including:
a waveform generation unit configured to generate a waveform according to a relative movement between two objects in a virtual space; and
an output control unit configured to control a haptic output and a sound output on the basis of frequency distribution of the waveform generated by the waveform generation unit.

(2) The information processing apparatus according to (1),
wherein the output control unit controls the sound output in a case in which the frequency distribution of the waveform includes a frequency higher than a certain frequency, and controls the haptic output in a case in which the frequency distribution of the waveform includes a frequency lower than the certain frequency.

(3) The information processing apparatus according to (2),
wherein the sound output is an output of a waveform related to the frequency higher than the certain frequency in the waveform, and
wherein the haptic output is an output of a waveform related to the frequency lower than the certain frequency in the waveform.

(4) The information processing apparatus according to any one of (1) to (3),
wherein the waveform generation unit generates a waveform having a frequency distribution according to a speed of the relative movement between the objects.

(5) The information processing apparatus according to any one of (1) to (4),
wherein the output control unit causes an output in a case in which a signal intensity of a frequency included in the frequency distribution of the waveform is higher than a certain threshold.

(6) The information processing apparatus according to (5),
wherein the waveform generation unit decides the signal intensity according to a pressure between the objects.

(7) The information processing apparatus according to (2) or (3),
wherein the output control unit sets the waveform as input signals of the haptic output and the sound output.

(8) The information processing apparatus according to (7),
wherein the output control unit sets, as the input signal of the sound output, a waveform obtained by filtering the frequency lower than the certain frequency from the frequency distribution of the waveform.

(9) The information processing apparatus according to (7) or (8),
wherein the output control unit sets, as the input signal of the haptic output, a waveform obtained by filtering the frequency higher than the certain frequency from the frequency distribution of the waveform.

(10) The information processing apparatus according to (8) or (9),
wherein in the filtering, a filtering intensity is varied according to a speed of the relative movement between the objects.

(11) The information processing apparatus according to any one of (1) to (10),
wherein at least one of the objects is moved by a user's operation.

(12) The information processing apparatus according to any one of (1) to (11),
wherein the waveform generation unit generates a waveform according to roughness information of a contact face between the objects.

(13) An information processing system including:
a waveform generation unit configured to generate a waveform according to a relative movement between two objects in a virtual space; and
an output control unit configured to control a haptic output and a sound output on the basis of frequency distribution of the waveform generated by the waveform generation unit.

(14) An information processing method including:
generating a waveform according to a relative movement between two objects in a virtual space; and
controlling a haptic output and a sound output on the basis of frequency distribution of the generated waveform.

(15) A program for causing a computer to execute:
a waveform generation function of generating a waveform according to relative movement between two objects in a virtual space; and
an output control function of controlling a haptic output and a sound output on the basis of frequency distribution of the waveform generated by the waveform generation function.

What is claimed is:

1. An information processing apparatus, comprising:
at least one processor configured to:
control reception of operation information from a device connected to the information processing apparatus, wherein the operation information indicates a user operation of the device;
determine a relative movement between two objects in a virtual space based on the user operation of the device;

control generation of a first waveform based on the relative movement between the two objects in the virtual space, wherein frequency distribution of the generated first waveform is based on a speed of the relative movement between the two objects;

control a haptic output and a sound output of the device based on the frequency distribution of the generated first waveform;

control the sound output based on the frequency distribution that includes a first frequency higher than a threshold frequency; and control the haptic output based on the frequency distribution that includes a second frequency lower than the threshold frequency.

2. The information processing apparatus according to claim 1,
wherein the sound output is an output of a second waveform related to the first frequency in the first waveform, wherein the first frequency is higher than the threshold frequency, and
wherein the haptic output is an output of a third waveform related to the second frequency in the first waveform, wherein the second frequency is lower than the threshold frequency.

3. The information processing apparatus according to claim 1,
wherein the at least one processor is further configured to control the haptic output and the sound output based on a signal intensity of a third frequency included in the frequency distribution of the first waveform, wherein the signal intensity is higher than a threshold.

4. The information processing apparatus according to claim 3, wherein the at least one processor is further configured to determine the signal intensity based on a pressure between the two objects.

5. The information processing apparatus according to claim 1,
wherein the at least one processor is further configured to set the first waveform as an input signal of the haptic output and the sound output.

6. The information processing apparatus according to claim 1,
wherein the at least one processor is further configured to set, as an input signal of the sound output, a second waveform obtained based on filtration of the second frequency from the frequency distribution of the first waveform, wherein the second frequency is lower than the threshold frequency.

7. The information processing apparatus according to claim 1,
wherein the at least one processor is further configured to set, as an input signal of the haptic output, a third waveform obtained based on filtration of the first frequency from the frequency distribution of the first waveform, wherein the first frequency is higher than the threshold frequency.

8. The information processing apparatus according to claim 6, wherein the at least one processor is further configured to:
control filtration of the generated first waveform; and
vary a filtering intensity of the filtration based on the speed of the relative movement between the two objects.

9. The information processing apparatus according to claim 1, wherein at least one object of the two objects is moved based on the user operation.

10. The information processing apparatus according to claim 1, wherein the at least one processor is further configured to control the generation of the first waveform based on roughness information of a contact face between the two objects.

11. An information processing system, comprising:
an information processing apparatus that comprises at least one processor, wherein the at least one processor is configured to:
control generation of a waveform based on a relative movement between two objects in a virtual space, wherein frequency distribution of the generated waveform is based on a speed of the relative movement between the two objects;
control a haptic output and a sound output based on the frequency distribution of the generated waveform;
control the sound output based on the frequency distribution that includes a first frequency higher than a threshold frequency; and
control the haptic output based on the frequency distribution that includes a second frequency lower than the threshold frequency.

12. An information processing method, comprising:
controlling reception of operation information from a device connected to an information processing apparatus, wherein the operation information indicates a user operation of the device;
determining a relative movement between two objects in a virtual space based on the user operation of the device;
generating a waveform based on the relative movement between the two objects in the virtual space, wherein frequency distribution of the generated waveform is based on a speed of the relative movement between the two objects;
controlling a haptic output and a sound output of the device based on the frequency distribution of the generated waveform;
controlling the sound output based on the frequency distribution that includes a first frequency higher than a threshold frequency; and
controlling the haptic output based on the frequency distribution that includes a second frequency lower than the threshold frequency.

13. A non-transitory computer-readable storage medium having stored thereon computer-executable instructions for causing a computer to perform operations, the operations comprising:
controlling reception of operation information from a device connected to an information processing apparatus, wherein the operation information indicates a user operation of the device;
determining a relative movement between two objects in a virtual space based on the user operation of the device;
generating a waveform based on the relative movement between the two objects in the virtual space, wherein frequency distribution of the generated waveform is based on a speed of the relative movement between the two objects;
controlling a haptic output and a sound output of the device based on the frequency distribution of the generated waveform;
controlling the sound output based on the frequency distribution that includes a first frequency higher than a threshold frequency; and controlling the haptic output based on the frequency distribution that includes a second frequency lower than the threshold frequency.

* * * * *